US008828535B2

United States Patent
Tokunaga et al.

(10) Patent No.: US 8,828,535 B2
(45) Date of Patent: Sep. 9, 2014

(54) COVER TAPE

(75) Inventors: Hisatsugu Tokunaga, Isesaki (JP); Yusuke Tanazawa, Isesaki (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/124,009

(22) PCT Filed: Nov. 5, 2009

(86) PCT No.: PCT/JP2009/068900
§ 371 (c)(1),
(2), (4) Date: Apr. 13, 2011

(87) PCT Pub. No.: WO2010/055804
PCT Pub. Date: May 20, 2010

(65) Prior Publication Data
US 2011/0212324 A1 Sep. 1, 2011

(30) Foreign Application Priority Data

Nov. 12, 2008 (JP) .................. 2008-289453
Mar. 18, 2009 (JP) .................. 2009-066060

(51) Int. Cl.
*B32B 7/02* (2006.01)
*B32B 27/32* (2006.01)
*B32B 7/12* (2006.01)
*B32B 27/08* (2006.01)
*B32B 27/30* (2006.01)

(52) U.S. Cl.
CPC ............ *B32B 27/32* (2013.01); *B32B 2255/26* (2013.01); *B32B 2307/20* (2013.01); *B32B 2250/24* (2013.01); *B32B 7/12* (2013.01); *B32B 27/08* (2013.01); *B23B 27/306* (2013.01); *B32B 2553/00* (2013.01); *B32B 2307/202* (2013.01); *B32B 2255/28* (2013.01); *B32B 27/308* (2013.01); *B32B 2255/10* (2013.01)
USPC ............................ 428/327; 428/344; 428/349

(58) Field of Classification Search
None
See application file for complete search history.

(56) References Cited

U.S. PATENT DOCUMENTS

| 5,079,072 A * | 1/1992 | Christopherson ............. 428/213 |
| 5,382,463 A * | 1/1995 | Adkins et al. ................. 428/141 |
| 5,846,652 A * | 12/1998 | Yamashita .................... 428/349 |

(Continued)

FOREIGN PATENT DOCUMENTS

| JP | 3241220 | 10/2001 |
| JP | 2003 508253 | 3/2003 |

(Continued)

OTHER PUBLICATIONS

Mutsuko et al., Jun. 7, 2006, JP 2006-176619 (Machine Translation).*
International Search Report issued Feb. 23, 2010 in PCT/JP09/68900 filed Nov. 5, 2009.

*Primary Examiner* — Callie Shosho
*Assistant Examiner* — Cheng Huang
(74) *Attorney, Agent, or Firm* — Oblon, Spivak, McClelland, Maier & Neustadt, L.L.P.

(57) ABSTRACT

Provided is a cover tape that has a small range of stripping strength and generates little static electricity when stripped at a high speed. The cover tape according to the present invention comprises at least a substrate layer, an intermediate layer, a charge transfer layer, and a heat seal layer, characterized in that (A) the charge transfer layer containing an acid-modified polyolefin resin and a conductive agent, and (B) the heat seal layer containing (a) a thermoplastic resin component composed of an acrylic resin, and (b) a styrene-conjugated diene copolymer or a hydrogenated resin thereof, the mass ratio of the two components ((a)/(b)) being 20/80 to 80/20.

16 Claims, 3 Drawing Sheets

(56) References Cited

U.S. PATENT DOCUMENTS

| | | |
|---|---|---|
| 2003/0127726 A1 | 7/2003 | Marumo et al. |
| 2003/0183553 A1 | 10/2003 | Fujimura et al. |
| 2005/0192404 A1 | 9/2005 | Ishii et al. |
| 2005/0244633 A1* | 11/2005 | Kobayashi et al. ....... 428/355 R |
| 2006/0000734 A1* | 1/2006 | Ninomiya et al. ............ 206/438 |
| 2006/0199005 A1* | 9/2006 | Fuji et al. ...................... 428/347 |
| 2007/0077685 A1* | 4/2007 | Noda et al. .................... 438/107 |

FOREIGN PATENT DOCUMENTS

| | | |
|---|---|---|
| JP | 2003 128132 | 5/2003 |
| JP | 2003 200990 | 7/2003 |
| JP | 2004 18080 | 1/2004 |
| JP | 2005 178073 | 7/2005 |
| JP | 2006 327624 | 12/2006 |
| TW | 200426030 A | 4/2004 |
| TW | I239889 B | 9/2005 |

* cited by examiner

COVER TAPE

TECHNICAL FIELD

The present invention relates to a cover tape for tape packaging, particularly a cover tape used as a covering for a carrier tape for storing electronic parts.

BACKGROUND ART

In recent years, chip-type electronic parts such as IC chips and capacitors have been stored in embossed portions of carrier tape formed consecutively at regular intervals, then transported and kept in storage as tape packages heat sealed with cover tape. When mounting the electronic parts stored in the tape packages on electronic circuit boards, the cover tape is continuously stripped at a high speed while the electronic parts are taken out one by one.

When using such tape packages, static electricity can be generated during transport and storage by the friction or contact between the electronic parts stored in the carrier tape and the embossed portions of the carrier tape or the cover tape. Among electronic parts, semiconductors have low breakdown voltages due to minimization of elements and reduced thickness of oxide films that accompany the size reduction of semiconductors, and can therefore be easily destroyed by static electricity. Additionally, while electronic parts other than semiconductors are rarely destroyed by static electricity, they are generally becoming smaller and lighter in weight, so that they may adhere to the side of the cover tape due to static electricity when the cover tape is stripped, as a result of which they may not be able to be picked up properly, thereby reducing the efficiency of the mounting process.

For this reason, various cover tapes have been investigated for the purpose of preventing problems caused by static electricity. For example, in JP-B 3241220 (Patent Document 1), conductive carbon particles, a conductive powder of a metal oxide etc., or metal microparticles are mixed in the carrier tape and/or cover tape or coated thereon as means for preventing build-up of static electricity in the tape package. In the case of cover tapes, a metal oxide (such as tin oxide or zinc oxide) is generally mixed in the heat seal layer to ensure transparency.

Additionally, JP-A 2005-178073 (Patent Document 2) proposes a method for preventing build-up of static electricity on the surface of a cover tape by providing a charge transfer layer between the substrate layer and heat seal layer.
Patent Document 1: JP-B 3241220
Patent Document 2: JP-A 2005-178073

SUMMARY OF THE INVENTION

When using tape packages, in addition to the static electricity generated by the friction or contact between the electronic parts and the carrier tape or cover tape, static electricity can also be generated by the stripping of cover tape from the carrier tape when the electronic parts are taken out. This phenomenon is called stripping static, which is caused by two substances being respectively charged to the positive side and the negative side depending on their relative position in the triboelectric series when the two overlaying substances are stripped apart. Due to the stripping static thus produced, electronic parts may adhere to the side of the cover tape or pop out from the carrier tape, reducing mounting efficiency.

However, the means for preventing static build-up described in Patent Documents 1 and 2 are intended to allow generated static electricity to escape into the atmosphere via the substrate surface or the surface of the heat seal layer, and they do not suppress the generation of static electricity by stripping static itself. For this reason, there have been cases where problems caused by static electricity during the mounting process are not sufficiently avoided.

Additionally, in the cover tape described in Patent Document 1, it is not easy to evenly distribute a large amount of a conductive powder of a metal oxide etc. as described above in the heat seal layer, so poor distribution can occur, and there can be a large difference (hereafter referred to simply as "range") in the stripping strength along the stripping direction when the cover tape is sealed to a carrier tape. When the range of stripping strength is large, the carrier tape vibrates strongly when the cover tape is stripped off, causing electronic parts to pop out from the embossed portions of the carrier tape, and so there is a risk of the electronic parts contacting the carrier tape or cover tape, resulting in damage, deterioration or contamination.

As such, there has been a demand for cover tapes with stabilized stripping strength (also called heat seal strength or peel off strength) when the cover tapes are stripped from the carrier tapes in addition to the suppression of the generation of static electricity. In particular, since polystyrene (hereafter indicated as "PS") resins and polycarbonate (hereafter indicated as "PC") resins are widely used as materials for carrier tapes, there has been a demand for cover tapes that have a small range of stripping strength and an excellent antistatic property with respect to these carrier tapes.

The present invention was achieved in view of these circumstances, and provides a cover tape that notably suppresses the generation of static electricity itself during stripping, efficiently diffuses and neutralizes static electricity when it is generated by friction or contact with an electronic part, has a small range of stripping strength, and allows for easy adjustment of the stripping strength.

Means for Solving the Problems

The present inventors, as a result of diligent study into the above-described problems, found that the problems addressed by the present invention could be solved by making a layered structure of a cover tape in the sequence of substrate layer/intermediate layer/charge transfer layer/heat seal layer, forming said charge transfer layer with a specific resin and a conductive agent, and forming the heat seal layer by a specific thermoplastic resin and a styrene-butadiene copolymer or a hydrogenated resin thereof.

That is, the cover tape according to the present invention comprises at least a substrate layer, an intermediate layer, a charge transfer layer and a heat seal layer, and is characterized in that
(A) the charge transfer layer comprises an acid-modified polyolefin resin and a conductive agent, and
(B) the heat seal layer comprises (a) a thermoplastic resin component consisting of an acrylic resin, and (b) a styrene-conjugated diene copolymer or a hydrogenated resin thereof, the mass ratio of the two components ((a)/(b)) being 20/80 to 80/20.

The acid-modified polyolefin resin in the charge transfer layer is preferably a resin modified by an acid anhydride, and more preferably an acid-modified resin of a copolymer of ethylene and carboxylic acid or a derivative thereof.

The conductive agent in the charge transfer layer is preferably at least one selected from carbon black, metal microparticles, metal oxides, conductive microparticles, Si-based organic compounds, organic conductive polymers, ionic liquids and surfactants.

The styrene ratio in (b) the styrene-conjugated diene copolymer or a hydrogenated resin thereof in the heat seal layer is preferably 20 to 70 parts by mass, and the acid value of (a) the thermoplastic resin component forming the heat seal layer is preferably 1 to 10 mg KOH/g.

The heat seal layer preferably comprises 1 to 60 parts by mass of a microparticle powder composed of inorganic microparticles or organic microparticles, in which the primary particles have a mass-average particle size of 0.01 to 20 μm, to 100 parts by mass of (a) the thermoplastic resin component.

The surface resistivity of the heat seal layer is preferably within a range of $10^5$ to $10^{12} \Omega/\square$.

The intermediate layer may be formed from a single layer or multiple layers, and is preferably formed from at least any one of ethylene-α-olefin copolymers having a density of 0.915 to 0.940 g/cm$^3$, copolymers of ethylene and carboxylic acid or a derivative thereof, and their modified resins.

An antistatic layer may be provided on the outer surface of the substrate layer.

The cover tape preferably has a total light transmittance of at least 75% and a haze of at most 50%. Additionally, the cover tape preferably has a static decay time of at most 2 seconds as measured in accordance with the US military standard MIL-B-81705C.

According to the present invention, the heat seal layer comprises (a) a thermoplastic resin component consisting of an acrylic resin and (b) a styrene-conjugated diene copolymer or a hydrogenated resin thereof. Since these resins do not mix with each other, the heat seal layer has a sea-island structure composed of an island region consisting of (a) the thermoplastic resin component consisting of an acrylic resin, and a sea region consisting of (b) the styrene-conjugated diene copolymer or a hydrogenated resin thereof. Consequently, the cover tape of the present invention is adhered to a carrier tape via two types of regions that differ in heat sealing properties as well as stripping static properties.

In addition, the charge transfer layer is provided on the surface of the heat seal layer on the substrate side. Since the charge transfer layer is formed by coating on the intermediate layer, and is an extremely thin film containing a large amount of a conductive agent, the cohesive force of the charge transfer layer is small, and the layer ruptures easily when the cover tape is stripped from a carrier tape.

When stripping such cover tape from a carrier tape, since the island region consisting of an acrylic resin has comparatively higher heat sealing properties, it is not stripped off from the carrier tape, and remains attached to the side of the carrier tape along with at least a portion of the charge transfer layer. In other words, cohesive stripping in the charge transfer layer and/or interlayer stripping between the charge transfer layer and intermediate layer occurs at the portion corresponding to the island region simultaneously with stripping at the interface between the sea region and the island region in the heat seal layer.

On the other hand, at the portion corresponding to the sea region, stripping occurs at the interface between the carrier tape and the sea region that has comparatively weaker heat sealing properties, and the heat seal layer is removed from the carrier tape together with the cover tape.

For this reason, the force required for stripping the cover tape, i.e. stripping strength, can be easily adjusted by changing the compounding ratio of (a) the thermoplastic resin component consisting of an acrylic resin and (b) the styrene-conjugated diene copolymer or a hydrogenated resin thereof in the heat seal layer, and by changing the acid modification ratio of the charge transfer layer.

Additionally, among resins used in heat sealing agents, acrylic resins are particularly prone to become positively charged, and are known to be easily charged when stripped from other layers.

According to the present invention, when stripping the cover tape from a carrier tape, the island region of the heat seal layer comprising an acrylic resin remains attached to the carrier tape along with the charge transfer layer, and therefore stripping between the layer consisting of an acrylic resin and other layers or the carrier tape does not occur. Additionally, while stripping does occur at the interface between the sea region and the island region in the heat seal layer, the area rubbed during stripping is sufficiently small, so the amount of static electricity generated by the stripping is extremely low. For this reason, the amount of electricity produced by stripping static during stripping of the cover tape from the carrier tape can be suppressed. Additionally, even if static electricity is generated by friction or contact with an electronic part, it can be diffused and neutralized appropriately via the charge transfer layer, and therefore it is possible to more certainly prevent problems caused by static electricity.

| Description of Reference Numbers | |
| --- | --- |
| 1 | cover tape |
| 2 | substrate layer |
| 3 | adhesive layer |
| 4 | intermediate layer |
| 5 | charge transfer layer |
| 6 | heat seal layer |
| 7 | island region |
| 8 | sea region |
| 10 | tape package |
| 11 | carrier tape |
| 12 | embossed portion |
| H | heat seal region |

MODES FOR CARRYING OUT THE INVENTION

Herebelow, an embodiment for carrying out the present invention shall be explained with reference to the drawings.

Figure 1:
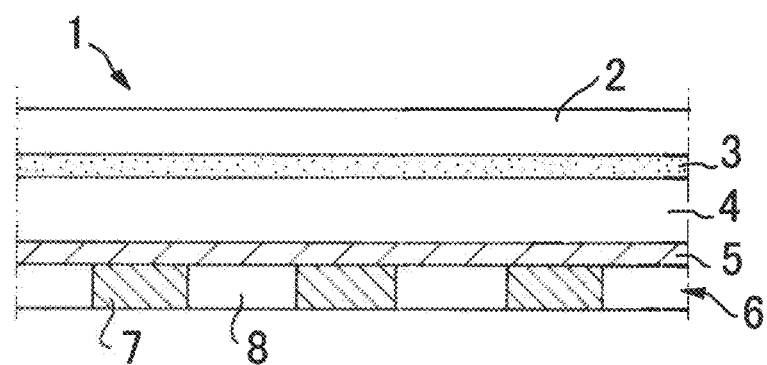
FIG. 1 is a cross-sectional view explaining the structure of a cover tape according to an embodiment of the present invention.

FIG. 1 shows a cross-sectional view of a cover tape according to the present embodiment.

A cover tape 1 of the present embodiment comprises a substrate layer 2, an intermediate layer 4 laminated on the substrate layer 2 via an adhesive layer 3, a charge transfer layer 5 formed by coating on the intermediate layer 4, and a heat seal layer 6. Heat seal layer 6 has a sea-island structure consisting of an island region 7 and a sea region 8.

<Substrate Layer>

Substrate layer 2 can be formed from a film composed of one layer or two laminated layers of any of the polyester resins commonly used for cover tapes such as polyethylene terephthalate (PET), polyolefin resins such as polypropylene, polyamide resins such as nylon and polycarbonate resins. With respect to polyesters such as polyethylene terephthalate, polyolefin resins such as polypropylene and polyamides such as nylon, the biaxially stretched may be more favorably used. The provision of such a substrate layer 2 can impart heat resistance and breakage resistance to cover tape 1. The thickness of substrate layer 2 can be set as appropriate depending on the intended purpose of the cover tape; for example, it can be approximately 6 to 50 µm. Moreover, the face on which the below-mentioned adhesive layer 3 is formed may be subjected to a surface treatment such as a corona treatment, plasma treatment or sand blast treatment as necessary beforehand to increase the adhesiveness with adhesive layer 3. Additionally, either face of substrate layer 2 may be subjected to a treatment for preventing generation of static electricity as necessary.

<Adhesive Layer>

Adhesive layer 3 is a layer for adhering the below-mentioned intermediate layer 4 to substrate layer 2, and can be formed from a combination of acrylic, isocyanate, urethane and ester adhesives as a dry laminate or an anchor coat (AC) adhesive, though it is not limited thereto. The thickness of the formed adhesive layer 3 is preferably 0.2 to 10 µm. While the method for forming adhesive layer 3 may be a common method and is not particularly limited, it can be formed, for example, by preparing a coating solution of a dispersion liquid or solution in which the above-described adhesive resin is dispersed or dissolved in water or an organic solvent, coating it on the surface of substrate layer 2 and drying it.

<Intermediate Layer>

Intermediate layer 4 is provided to strengthen the adhesive force between substrate layer 2 and the below-mentioned charge transfer layer 5, and to distribute the areas of contact with the thermal compression bonding iron during heat sealing to thereby obtain a more stabilized adhesion. For example, at least one of low-density polyethylene, polypropylene, and ethylene copolymers can be used as the material for intermediate layer 4. Particularly, examples of ethylene copolymers may include ethylene-acrylic acid copolymers, ethylene-acetate vinyl copolymers and ethylene-α-olefin copolymers with a density of 0.915 to 0.940 g/cm$^3$, and blends thereof. The ethylene-α-olefin copolymers used to form intermediate layer 4 are copolymers of ethylene and, for example, butane, pentene, hexane, heptene, octene, or 4-methyl pentene-1. Additionally, these esters are also included in both the "acrylic acid" and "methacrylic acid" in the above-described "ethylene-acrylic acid copolymers" and "ethylene-methacrylic acid copolymers" in the present invention. Additionally, when an ethylene-α-olefin copolymer polymerized by a metallocene catalyst is used, resistance to the stress applied to cover tape 1 during stripping is excellent, and it is therefore more preferred because of the stable strip force.

The thickness of intermediate layer 4 is usually preferably 10 to 60 µm, and is further preferably 20 to 50 µm. When the thickness of the intermediate layer is less than 10 µm, there is a possibility that the film-forming property will be poor, and when it exceeds 60 µm, there is a risk that the thermal adhesiveness to cover tape 1 will be poor. Additionally, this intermediate layer 4 can be formed on top of the above-described adhesive layer 3 by a dry lamination method or extrusion lamination method etc.

<Charge Transfer Layer>

Charge transfer layer 5 consists of a resin in which conductive microparticles are mixed with a modified polyolefin resin. Charge transfer layer 5 allows easy adjustment of the stripping strength by changing the modification ratio of the modified polyolefin resin, and it further enables suppression of problems caused by static electricity by diffusing static electricity generated by stripping. The resin used to form charge transfer layer 5 is a copolymer of ethylene and carboxylic acid or a derivative thereof, and examples thereof include ethylene-acetate vinyl copolymers (EVA), ethylene-methacrylic acid methyl copolymers (EMMA), ethylene-acrylic acid ethyl copolymers (EEA), ethylene-acrylic acid methyl copolymers (EMA), ethylene-acrylic acid copolymers (EAA), ethylene-methacrylic acid copolymers (EMAA), and mixtures in which at least one of these copolymers is used. The interlayer adhesive force between charge transfer layer 5 and the neighboring layers can be adjusted by further acid-modifying this resin by subjecting it to an addition reaction with an acid modifying agent such as maleic anhydride, maleic acid or sulfonic acid, and changing the modification ratio. In order for the effect of improved adhesiveness by acid modification to manifest without interfering with the properties of the resins themselves, the ratio of acid modification by, for example, maleic anhydride is preferably 1 to 15 parts by mass to 100 parts by mass of the resin, and further preferably 2 to 10 parts by mass. The constituting resin can contain an additive such as a dispersion stabilizer, lubricant, antioxidant or anti-blocking agent, as necessary. Additionally, one that is cross-linked by the addition of a cross-linking agent may be used.

Charge transfer layer 5 may be formulated with metal microparticles such as carbon black, gold, silver, nickel, aluminum or copper; a metal oxide such as tin oxide, zinc oxide or titanium oxide; conductive microparticles of barium sulfate that has been made conductive; conductive microparticles of a sulfide, such as zinc sulfide, copper sulfide, cadmium sulfide, nickel sulfide or palladium sulfide, that have been made conductive; a Si-based organic compound; an organic conductive polymer such as polypyrrole, polyaniline or polythiophene; an ionic liquid; or a surfactant, as the conductive agent. The mass-average particle size of the primary particles in the particulate conductive agent is preferably 0.005 to 5 µm. In this case, the mixing ratio of the acid-modified polyolefin resin and the conductive agent such as conductive microparticles in charge transfer layer 5 is preferably within a range of 1:1 to 1:20 by mass ratio. When the mixing ratio of the conductive microparticles etc. is lower than the above range, there is a risk that the mixing effect of the conductive microparticles etc. will be insufficient, and when it exceeds the above range, there is a possibility that the adhesive strength between charge transfer layer 5 and the below-mentioned heat seal layer 6 will be reduced.

The thickness of charge transfer layer 5 is preferably within a range of 0.01 to 10 µm, particularly 0.05 to 5 µm. When the thickness of the charge transfer layer is less than 0.01 µm, a sufficient antistatic property might not be obtainable, and when it exceeds 10 µm, there is a risk that the cohesive force of charge transfer layer 5 itself will be reduced, resulting in a reduction of the stripping strength. The above charge transfer layer 5 can be formed by coating intermediate layer 4 using a well known coating technique.

<Heat Seal Layer>

Heat seal layer 6 is formed from a resin composition comprising (a) a thermoplastic resin consisting of an acrylic resin at 20 to 80 parts by mass, and (b) a styrene-conjugated diene copolymer or a hydrogenated resin thereof at 80 to 20 parts by mass. Particularly, in order to further reduce the range of stripping strength, it is preferably formed from (a) the thermoplastic resin at 30 to 70 parts by mass, and (b) the styrene-conjugated diene copolymer or a hydrogenated product thereof at 70 to 30 parts by mass. Heat seal layer 6, due to the presence of components (a) the thermoplastic resin and (b) the styrene-conjugated diene copolymer or a hydrogenated product thereof, has a sea-island structure in which a dispersed phase consisting of (a) the thermoplastic resin (i.e. island region 7) is dispersed in a continuous phase consisting of (b) the styrene-conjugated diene copolymer or a hydrogenated product thereof (i.e. sea region 8).

Representative examples of (a) the thermoplastic resin consisting of an acrylic resin may include copolymers of any monomer selected from methyl (meth)acrylate, ethyl (meth)acrylate, butyl (meth)acrylate, glycidyl (meth)acrylate, and (meth)acrylic acid, and copolymers of at least two of these monomers.

Representative examples of (b) the styrene-conjugated diene copolymer may include styrene-butadiene-styrene block copolymers (SBS) and styrene-isoprene-styrene block copolymers (SIS), and examples of the hydrogenated product thereof may include SEBS (hydrogenated product of SBS), SBBS (partially hydrogenated product of SBS) and SEPS (hydrogenated product of SIS).

The styrene ratio of (b) the styrene-conjugated diene copolymer or the hydrogenated resin thereof used in heat seal layer 6 is preferably 20 to 70 parts by mass in order to reduce the range of stripping strength.

Heat seal layer 6 preferably contains 1 to 60 parts by mass of a microparticle powder composed of inorganic microparticles or organic microparticles with primary particles having a mass-average particle size of 0.01 to 20 μm, to 100 parts by mass of the above-described resin composition ((a)+(b)) in order to prevent blocking. When the microparticle powder is present at 1 part by mass or less, there is a risk that the blocking preventing effect will be insufficient, and when it is present at 60 parts by mass or more, there is a risk that adhesion during heat sealing will be insufficient and that the range of stripping strength will be large.

In order to maintain the adhesiveness between heat seal layer 6 and the above-described charge transfer layer 5 during the environmental changes after heat sealing, the above-described (a) thermoplastic resin preferably has an acid value of 1 to 10 mg KOH/g. When the acid value is below 1 mg KOH/g, the stripping strength might be reduced significantly due to the environmental changes after heat sealing, and when it exceeds 10 mg KOH/g, the stripping strength might be unstable due to the environmental changes after heat sealing.

Heat seal layer 6 can be formed by a well-known coating method such as a direct gravure method, gravure reverse method, kiss reverse method, die coating method, lip coating method, or simultaneous multilayer die coating method together with charge transfer layer 5.

The thickness of heat seal layer 6 is usually preferably 0.1 to 10 μm, and is particularly preferably 0.3 to 2 μm. When the thickness of the heat seal layer 6 is less than 0.1 μm, it might be difficult to form heat seal layer 6 with stabilized thickness accuracy. Additionally, when the thickness of heat seal layer 6 exceeds 10 μm, there is a risk that the dry patches during drying of the coating will induce a poor appearance or reduction in transparency.

The cross-sectional area parallel to the plane of cover tape 1 of island region 7, which is the dispersed phase of heat seal layer 6, is particularly preferably within a range of 0.0001 to 0.01 mm$^2$, and is further preferably within a range of 0.0001 to 0.005 mm$^2$. When the above-described cross-sectional area of island region 7 is within the range of 0.0001 to 0.01 mm$^2$, a more appropriate stripping strength can be obtained. The above-described cross-sectional area of island region 7 can be adjusted by changing the compounding ratio of (a) the thermoplastic resin and (b) the styrene-conjugated diene copolymer or a hydrogenated product thereof.

The surface resistivity of the surface of heat seal layer 6 is preferably within a range of $10^5$ to $10^{12}$ Ω/□ at 23±5° C. and 50±5% R.H. (relative humidity).

<Cover Tape>

Cover tape 1 preferably has a static decay time of at most 2 seconds as measured in accordance with the US military standard MIL-B-81705C (static decay time required for 5000 V to decay by 99% at 23±5° C. and 12±3% R.H.).

Additionally, cover tape 1 can be provided with an antistatic layer (not shown in the drawings) on the outer surface of substrate layer 2 so as to prevent contaminants from adhering due to static electricity. This antistatic layer can be a layer comprising at least one of anionic, cationic, non-ionic and amphoteric surfactants, fatty acid derivatives, tetrafunctional silicon partial hydrolysis products, a fine conductive powder composed of a fine metal powder, metal oxide, metal sulfide or sulfate that has been subjected to a conductivity treatment, and conductive carbons, and can be formed by a common method. The antistatic layer has a surface resistivity within a range of $10^5$ to $10^{12}$ Ω/□ at 23±5° C. and 50±5% R.H., and has an excellent antistatic property.

<Carrier Tape>

As the material for the carrier tape to be heat sealed using the above cover tape, a material that allows easy sheet formation, such as polyvinyl chloride (PVC), polystyrene (PS), polyester (A-PET, PEN, PET-G or PCTA), polypropylene (PP), polycarbonate (PC), polyacrylonitrile (PAN) acrylonitrile-butadiene-styrene copolymer (ABS), may be used; and while it may be any of these resins used alone, and/or a copolymer resin having any of these as main ingredients, a mixture (including alloys), or a laminate consisting of multiple layers thereof, when considering adhesiveness in particular, a combination with a PS- or PC-based carrier tape is preferred. The thickness of the sheet can usually be approximately 30 to 1000 μm, but is preferably 50 to 700 μm and optimally 80 to 300 μm. Formability is poor at a thickness above these ranges, and strength is insufficient at a thickness below these ranges. An additive, such as a filler, plasticizer, coloring, antistatic agent or a conductive agent, may be added to the sheet as necessary.

The method for producing the carrier tape may be a common method, is not particularly limited, and a forming method, such as unheated plastic press forming by a male-female mold, heated vacuum forming, pressure forming or vacuum pressure forming, or any of these forming methods in combination with plug assist, can be applied to a strip of resin sheet of a certain width.

<Tape Package>

Figure 2:
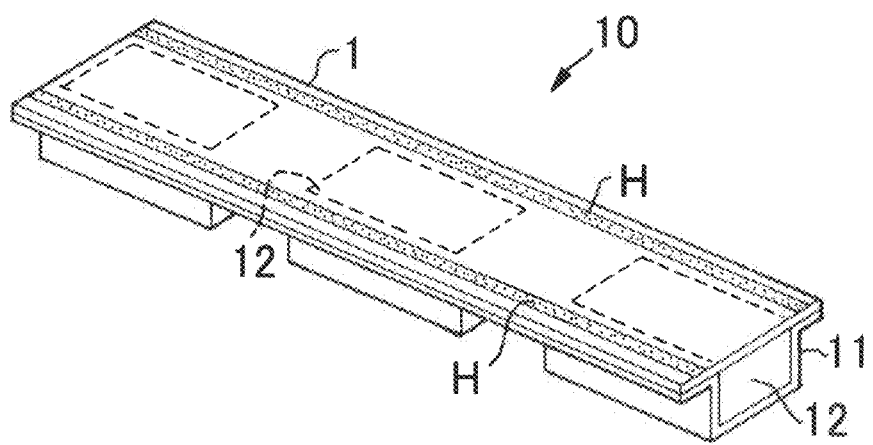
FIG. 2 is a perspective view of a tape package obtained by heat sealing a cover tape according to an embodiment of the present invention to a carrier tape.

After loading electronic parts (not shown in the drawings) in embossed portions 12 of carrier tape 11 as shown in, for example, FIG. 2, the above-described cover tape 1 is heat sealed to carrier tape 11 such that the electronic parts will not pop out. The electronic parts are transported and kept in storage in the form of a tape package 10 thus obtained, then extracted by stripping the cover tapes continuously at a high speed and mounted on circuit boards using a mounting machine called a mounter.

<Heat Sealing and Stripping>

While the method for heat sealing (thermal fusion bonding) cover tape 1 to carrier tape 11 is not particularly limited, the method commonly used is one in which a device called a sealing iron is used to apply a certain pressure while providing an amount of heat that allows the resin constituting heat seal layer 6 at heat seal regions H of cover tape 1 to have sufficient stripping strength. As the method for pressing a sealing iron against the top of cover tape 1 onto carrier tape 11 so as to thermally bond them, a repeated sealing method in which the sealing iron is applied several times, or a continuous sealing method in which the sealing iron is applied continuously to the side of the cover tape to achieve thermal fusion bonding can be used.

Figure 3:
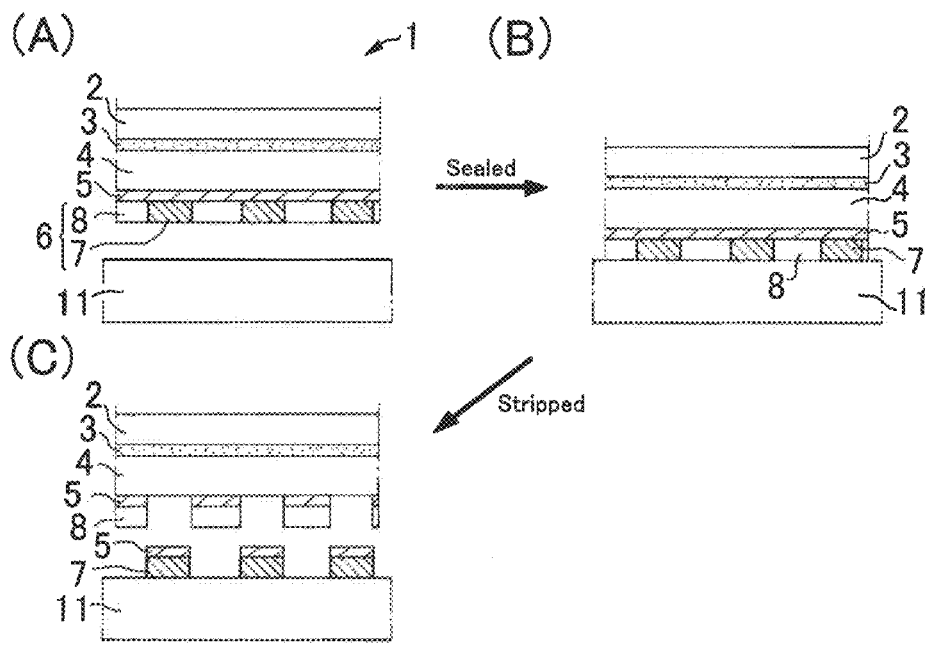
FIG. 3 is a schematic view showing a stripping configuration when the cover tape according to an embodiment of the present invention is stripped from a carrier tape.

Next, the stripping configuration when stripping cover tape 1 from carrier tape 11 shall be explained with reference to FIG. 3. First, as shown in FIG. 3A and FIG. 3B, cover tape 1 is, for example, thermally bonded to carrier tape 11 equipped with embossed portions 12. This thermal fusion bonding is performed at heat seal regions H in FIG. 2. Since heat seal layer 6 of cover tape 1 has a sea-island structure formed by island region 7 consisting of (a) a thermoplastic resin component consisting of an acrylic resin, and sea region 8 consisting of (b) a styrene-conjugated diene copolymer or a hydrogenated resin thereof, cover tape 1 adheres to carrier tape 11 via two types of regions that differ in heat sealing properties as well as stripping static properties.

When stripping cover tape 1 from carrier tape 11, as shown in FIG. 3C, since island region 7 consisting of an acrylic resin has comparatively stronger heat sealing properties, interlayer stripping occurs between charge transfer layer 5 and intermediate layer 4 at island region 7, and heat seal layer 6 remains attached to the side of the carrier tape along with charge transfer layer 5.

On the other hand, at the portion corresponding to sea region 8, since sea region 8 has comparatively weaker heat sealing properties, interface stripping occurs between carrier tape 11 and sea region 8, and heat seal layer 6 is stripped from carrier tape 11 together with cover tape 1.

For this reason, the force required for stripping cover tape 1, i.e. stripping strength, can be easily adjusted by changing the constitution ratio of the sea and island in heat seal layer 6, i.e. the compounding ratio of (a) the thermoplastic resin component consisting of an acrylic resin and (b) the styrene-conjugated diene copolymer or a hydrogenated resin thereof, and by changing the acid modification ratio of the charge transfer layer 5. For example, since the lower the compounding ratio of the thermoplastic resin component consisting of an acrylic resin contained in heat seal layer 6 is, the greater the ratio of sea region 8, it is possible to reduce the force required for stripping cover tape 1 from carrier tape 11. Additionally, the adhesive force between charge transfer layer 5 and intermediate layer 4 can be reduced by lowering the acid modification ratio of charge transfer layer 5. By adjusting the adhesive force of each layer in this way, the stripping strength and stripping configuration (or places where stripping occurs) can be adjusted.

Additionally, according to this stripping configuration, island region 7 of heat seal layer 6 consisting of an acrylic resin which is positioned at the most positive polarity of the triboelectric series is not stripped off from the charge transfer layer or carrier tape 11, so stripping static can be minimized. Additionally, while this island region 7 is stripped off at the interface between sea region 8 and island region 7 in heat seal layer 6, the area rubbed during stripping is sufficiently small, so that the amount of static electricity generated by the stripping is extremely low. For this reason, the generation of static electricity during stripping of the cover tape 1 from the carrier tape 11 can be suppressed.

EXAMPLES

Herebelow, the present invention shall be explained in detail using examples, but the present invention is not limited thereto.

Example 1

After coating an ester adhesive on one side of a biaxially stretched PET film ("T6140" manufactured by Toyobo Co., Ltd.; thickness: 12 μm) that had been subjected to an antistatic treatment such that the thickness after drying would be 3 μm and allowing it to dry and solidify, a linear low-density polyethylene film ("LL-UL" manufactured by Futamura Chemical Co., Ltd.; thickness: 40 μm) was dry laminated thereon as the intermediate layer to obtain a film product. Next, after subjecting the surface of the linear low-density polyethylene film of the above film product to a simple adhesion treatment by a corona treater, an aqueous solution of a mixture of 94 parts by mass of tin oxide with primary particles having a mass-average particle size of 0.008 μm to 6 parts by mass of a maleic anhydride-modified ethylene ethyl acrylate copolymer (EEA) resin was coated by gravure coating such that the thickness after drying would be 0.4 μm as the charge transfer layer. The above-described acid-modified polyolefin had an acid modification ratio of 10 parts by mass to 100 parts by mass of the composition resin. Further, as the heat seal layer, a mixture of 10 parts by mass of a silica powder with primary particles having a mass-average particle size of 0.1 μm to 30 parts by mass of a butyl methacrylate/methyl methacrylate copolymer "Dianal BR-106" (manufactured by Mitsubishi Rayon Co., Ltd.; acid value: 3.5 mg KOH/g) and 70 parts by mass of an SEBS copolymer "Tuftec H1141" (manufactured by Asahi Kasei Chemicals Corporation; St ratio: 30 mass %) was dissolved in toluene, and coated by gravure coating such that the thickness after drying would be 1.0 μm to produce a laminated film that would be the cover tape.

Example 2

Other than using 50 parts by mass of the above-described copolymer "Dianal BR-106" and 50 parts by mass of the SEBS copolymer "Tuftec H1141" as the resin component of the heat seal layer, a laminated film was produced in the same manner as Example 1.

Example 3

Other than using 70 parts by mass of the above-described copolymer "Dianal BR-106" and 30 parts by mass of the SEBS copolymer "Tuftec H1141" as the resin component of the heat seal layer, a laminated film was produced in the same manner as Example 1.

<Stripping Strength>

The laminated films obtained in the above Examples 1-3 were cut into 5.5 mm wide thin strips to make cover tapes, which were heat sealed to 8 mm wide conductive PC-based carrier tapes under the conditions described below, and stripping strength was measured. Averages and ranges of the stripping strength were derived from charts obtained when stripping the cover tapes for 100 mm at a speed of 300 mm/min in the stripping direction.

Sealing Conditions:
Sealing Temperature=140 to 220° C., Sealing Time=0.5 sec., Sealing Pressure=0.345 MPa
Number of Times Sealing Was Performed=sealing performed 2 times (double sealing)

Figure 4:
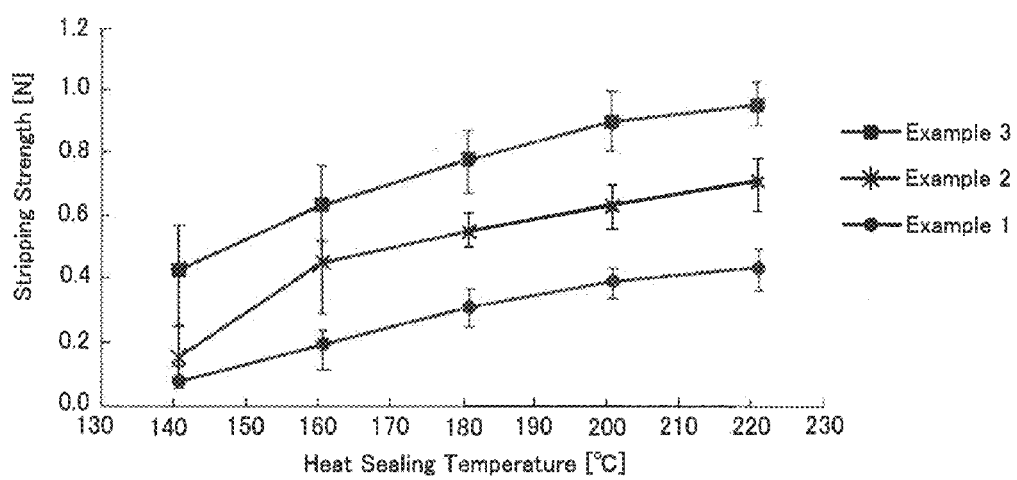
FIG. 4 is a graph showing the relationship between the heat sealing temperature and the stripping strength of the cover tapes of Examples 1 to 3 when stripped from carrier tapes.

The results are shown in FIG. 4.

<Observation of Stripping Configuration>

The stripping configuration with respect to the surface on the side of the heat seal of the carrier tape was observed using a scanning electron microscope.

Figure 5:
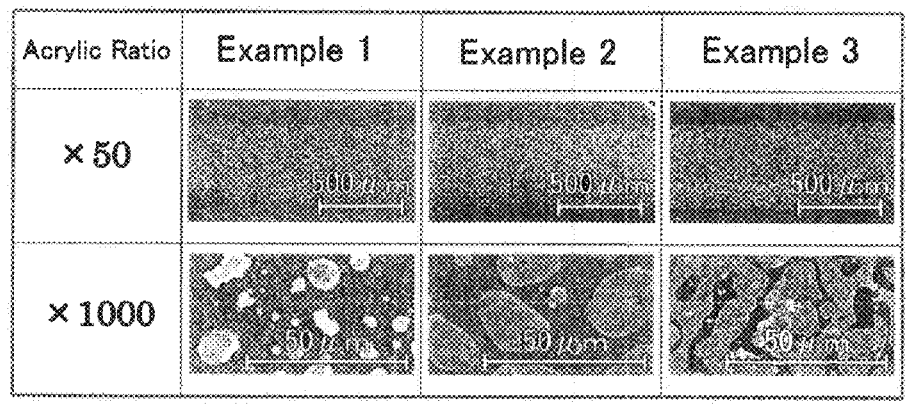
FIG. 5 are scanning electron microscope photographs of the surface of the carrier tapes when the cover tapes of Examples 1 to 3 are stripped from the carrier tapes.

The results are shown in FIG. 5.

Comparative Example 1

Other than not providing a charge transfer layer on the intermediate layer that had been subjected to a simple adhesion treatment by a corona treater, and forming the heat seal layer by coating a solution of a mixture of 100 parts by mass of tin oxide with primary particles having a mass-average particle size of 0.008 μm and 10 parts by mass of a silica powder with primary particles having a mass-average particle size of 0.1 μm to 100 parts by mass of a butyl methacrylate/ methyl methacrylate copolymer "Dianal BR-106" (manufactured by Mitsubishi Rayon Co., Ltd.; acid value: 3.5 mg KOH/g) dissolved in toluene by gravure coating such that the thickness after drying would be 1.0 μm, a laminated film that would be the cover tape was produced in the same manner as Example 1.

<Evaluation of Charge Distribution>

The cover tapes of Example 2 and Comparative Example 1 were measured for surface charge distribution on the side of the heat seal layers of the cover tapes stripped from carrier tapes at a stripping speed of 300 mm/min using a potential measuring probe (Isoprobe Electrostatic Voltmeter Model: 279 manufactured by Monroe Electronics Inc.) under the conditions described below.

Distance from Cover Tape to Probe=0.5 mm
Scanning Area=10 mm×8 mm
Time Elapsed from Stripping to Charge Measurement=approximately 10 sec.

Figure 6:
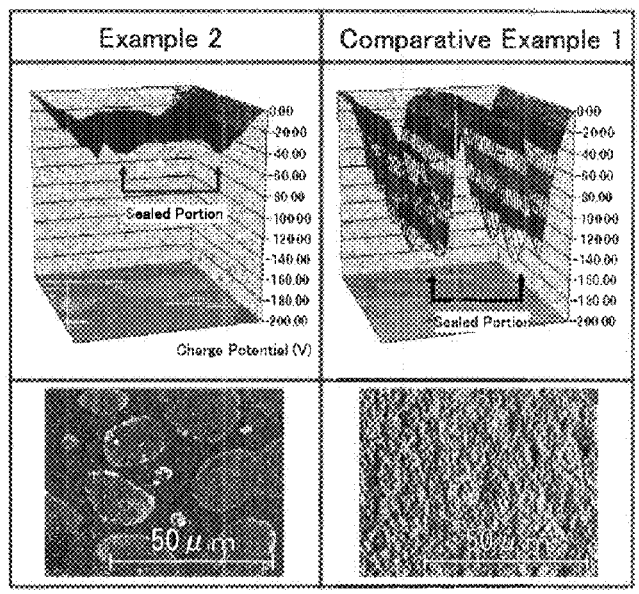
FIG. 6 are graphs showing the charge potential when the cover tapes of Example 2 and Comparative Example 1 are stripped from the carrier tapes, and scanning electron microscope photographs of the surface of the carrier tapes.

The results are shown in FIG. 6.

Example 4

After coating an ester adhesive on one side of a biaxially stretched PET film ("T6140" manufactured by Toyobo Co., Ltd.; thickness: 12 μm) that had been subjected to an antistatic treatment such that the thickness after drying would be 3 μm and allowing it to dry and solidify, a linear low-density polyethylene film ("LL-UL" manufactured by Futamura Chemical Co., Ltd.; thickness: 40 μm) was dry laminated thereon as the intermediate layer to obtain a film product. Next, after subjecting the surface of the linear low-density polyethylene film of the above film product to a simple adhesion treatment by a corona treater, an aqueous solution of a mixture of 94 parts by mass of tin oxide with primary particles having a mass-average particle size of 0.008 μm to 6 parts by mass of a maleic anhydride-modified ethylene ethyl acrylate copolymer (EEA) resin was coated by gravure coating such that the thickness after drying would be 0.4 μm as the charge transfer layer. The above-described acid-modified polyolefin had an acid modification ratio of 10 parts by mass to 100 parts by mass of the composition resin. Further, as the heat seal layer, a mixture of 10 parts by mass of a silica powder with primary particles having a mass-average particle size of 0.1 μm to 50 parts by mass of a butyl methacrylate/methyl methacrylate copolymer "Dianal BR-106" (manufactured by Mitsubishi Rayon Co., Ltd.; acid value: 3.5 mg KOH/g) and 50 parts by mass of an SBBS copolymer "Tuftec P1500" (manufactured by Asahi Kasei Chemicals Corporation; St ratio: 30 mass %) was dissolved in toluene, and coated by gravure coating such that the thickness after drying would be 1.0 μm to produce a laminated film that would be the cover tape.

Example 5

Other than using a mixture of 10 parts by mass of the silica powder with primary particles having a mass-average particle size of 0.1 μm to 70 parts by mass of the butyl methacrylate/methyl methacrylate copolymer "Dianal BR-106" and 30 parts by mass of the SBBS copolymer "Tuftec P1500" as the heat seal layer, a laminated film was produced in the same manner as Example 4.

Example 6

Other than using a mixture of 10 parts by mass of the silica powder with primary particles having a mass-average particle size of 0.1 μm to 50 parts by mass of the butyl methacrylate/methyl methacrylate copolymer "Dianal BR-106" and 50 parts by mass of a SBBS copolymer "Tuftec P2000" (manufactured by Asahi Kasei Chemicals Corporation; St ratio: 57 mass %) as the heat seal layer, a laminated film was produced in the same manner as Example 4.

Example 7

Other than using a mixture of 10 parts by mass of the silica powder with primary particles having a mass-average particle size of 0.1 μm to 50 parts by mass of a butyl methacrylate/methyl methacrylate copolymer "Dianal BR-116" (manufactured by Mitsubishi Rayon Co., Ltd.; acid value: 7 mg KOH/g) and 50 parts by mass of the SBBS copolymer "Tuftec P1500" as the heat seal layer, a laminated film was produced in the same manner as Example 4.

Example 8

Other than using a mixture of 5 parts by mass of acrylic microparticles with primary particles having a mass-average particle size of 2 μm to 50 parts by mass of the butyl methacrylate/methyl methacrylate copolymer "Dianal BR-106" and 50 parts by mass of the SBBS copolymer "Tuftec P1500" as the heat seal layer, a laminated film was produced in the same manner as Example 4.

Example 9

Other than coating an aqueous solution of a mixture of 90 parts by mass of tin oxide with primary particles having a mass-average particle size of 8 nm to 10 parts by mass of the maleic anhydride-modified ethylene ethyl acrylate copolymer (EEA) resin (the acid modification ratio being 10 parts by mass to 100 parts by mass of the composition resin) by gravure coating such that the thickness after drying would be 0.1 μm as the charge transfer layer, a laminated film was produced in the same manner as Example 4

Example 10

Other than using an acid-modified polyolefin resin with an acid modification ratio of 3 parts by mass to 100 parts by mass of the composition resin for the charge transfer layer, a film was produced in the same manner as Example 9.

Example 11

Other than using an inflation film of a maleic anhydride-modified polyolefin resin ("F1100" manufactured by Ube Maruzen Polyethylene Co., Ltd.) as the intermediate layer, a film was produced in the same manner as Example 9.

Comparative Example 2

Other than using a mixture of 10 parts by mass of the silica powder with primary particles having a mass-average particle size of 0.1 μm to 100 parts by mass of the butyl methacrylate/methyl methacrylate copolymer "Dianal BR-106" as the heat seal layer, a laminated film was produced in the same manner as Example 4.

Comparative Example 3

Other than using a mixture of 10 parts by mass of the silica powder with primary particles having a mass-average particle size of 0.1 μm to 90 parts by mass of a high impact polystyrene (HIPS) ("Toyo Styrol HI H870" manufactured by Toyo Styrene Co., Ltd.) as the heat seal layer, a laminated film was produced in the same manner as Example 4.

Comparative Example 4

Other than directly forming the heat seal layer without providing a charge transfer layer on the surface of the intermediate layer that had been subjected to a simple adhesion treatment by a corona treater, a laminated film was produced in the same manner as Example 4.

Comparative Example 5

Other than forming the charge transfer layer by coating an aqueous solution of a mixture of 94 parts by mass of tin oxide with primary particles having mass-average particle size of 0.01 μm (conductive microparticles "EPSPDL-2" manufactured by Mitsubishi Materials Corporation) to 6 parts by mass of an ethylene-methacrylate copolymer (EMAA) resin ("Aquatex AC-3100" manufactured by Chuo Rika Kogyo Co, Ltd.) by gravure coating such that the thickness after drying would be 0.4 μm, a laminated film was produced in the same manner as Example 4.

Comparative Example 6

After coating an ester adhesive on one side of a biaxially stretched polyethylene terephthalate (PET) film ("E5102" manufactured by Toyobo Co., Ltd.; thickness: 12 μm) such that the thickness after drying would be 3 μm and allowing it to dry and solidify, a linear low-density polyethylene film ("SE625L" manufactured by Tamapoly Co., Ltd.; thickness: 30 μm) was dry laminated thereon as the intermediate layer to obtain a film product. Next, a coating solution of a mixture of 30 parts by mass of a polyurethane resin ("Nipporan 5120" manufacture by Nippon Polyurethane Industry Co., Ltd.), 7.5 parts by mass of a vinyl chloride-vinyl acetate copolymer resin ("Vinylite VAGH" manufactured by Union Carbide Corporation), and 62.5 parts by mass of conductive microparticles (conductive microparticles "T-1" manufactured by Mitsubishi Materials Corporation) was coated on the surface of the linear low-density polyethylene film of the above film product by gravure coating such that the thickness after drying would be 2.0 μm. Further, as the heat seal layer, 100 parts by mass of a polyurethane resin ("EX7240" manufactured by Honny Chemicals Co, Ltd.) was coated by gravure coating such that the thickness after drying would be 0.5 μm.

Comparative Example 7

After coating an ester adhesive on one side of a biaxially stretched polyethylene terephthalate (PET) film ("E5102" manufactured by Toyobo Co., Ltd.; thickness: 12 μm) such that the thickness after drying would be 3 μm and allowing it to dry and solidify, a linear low-density polyethylene film ("SE625L" manufactured by Tamapoly Co., Ltd.; thickness: 30 μm) was dry laminated thereon as the intermediate layer to obtain a film product. Next, the surface of the linear low-density polyethylene film of the above film product was subjected to a simple adhesion treatment by a corona treater, and an aqueous solution of a maleic anhydride-modified ethylene-ethyl acrylate copolymer (EEA) resin was coated thereon by gravure coating such that the thickness after drying would be 0.1 μm. The above-described acid-modified polyolefin had an acid modification ratio of 10 parts by mass to 100 parts by mass of the composition resin. Further, as the heat seal layer, a mixture of 10 parts by mass of a silica powder with primary particles having a mass-average particle size of 0.1 μm to 80 parts by mass of a methyl methacrylate/ethyl acrylate copolymer ("B44" manufactured by The Dow Chemical Company) and 20 parts by mass of a methyl methacrylate/butyl acrylate copolymer ("B48S" manufactured by The Dow Chemical Company) was dissolved in toluene, and coated by gravure coating such that the thickness after drying would be 1.0 μm.

The films to be used as cover tapes obtained in the above Examples 4 to 11 and Comparative Examples 2 to 7 were evaluated according to the methods below.

1. Stripping Strength

The films of the Examples and Comparative Examples were each cut into 5.5 mm wide thin strips to make cover tapes, which were heat sealed to 8 mm wide conductive PS-based carrier tapes under the conditions described below, and the stripping strength was measured. Averages and ranges of the stripping strength were derived from charts obtained when stripping the cover tapes for 100 mm at a speed of 300 mm/min in the stripping direction.

Sealing Conditions:
Sealing Temperature=150° C., Sealing Time=0.5 sec., Sealing Pressure=0.345 MPa
Number of Times Sealing Was Performed=sealing performed 2 times (double sealing)

2. Surface Resistivity

Measurements were performed in accordance with JIS K 6911 using Hiresta UP (Mitsubishi Chemical Corporation) in an environment of 23±5° C. and 50±5% R.H. (applied voltage=500 V; application time=30 sec.).

3. Measurement of Static Decay Time

The time required for 5000 V to decay by 99% was measured in accordance with MIL-B-81705C using static decay meter (ETS, Inc.) in an environment of 23±5° C. and 12±3% R.H.

4. Measurement of Total Light Transmittance and Haze

Measurements were performed using a haze meter (Haze-Gard Plus manufactured by Gardner).

5. Measurement of Maximum Charge Potential

The surface charge distribution on the side of the heat seal layers of the cover tapes stripped from carrier tapes at a stripping speed of 300 mm/min was measured using a potential measuring probe (Isoprobe Electrostatic Voltmeter Model: 279 manufactured by Monroe Electronics Inc.), and the maximum charge potentials were measured under the conditions described below.

Distance from Cover Tape to Probe=0.5 mm
Scanning Area=10 mm×8 mm
Time Elapsed from Stripping to Charge Measurement=approximately 10 sec.

The evaluation results are shown in Table 1.

TABLE 1

|  | Stripping Strength [N/mm] | | Surface Resistivity | Static Decay | Total Light Transmittance | Haze | Charge Potential |
| --- | --- | --- | --- | --- | --- | --- | --- |
|  | Average | Range | [Ω/□] | Time [sec] | [%] | [%] | [V] |
| Example 4 | 0.45 | 0.25 | $5 \times 10^9$ | 0.03 | 90 | 13 | −45 |
| Example 5 | 0.53 | 0.25 | $6 \times 10^9$ | 0.03 | 90 | 13 | −42 |
| Example 6 | 0.60 | 0.27 | $6 \times 10^9$ | 0.03 | 90 | 16 | −51 |
| Example 7 | 0.45 | 0.27 | $5 \times 10^9$ | 0.03 | 90 | 12 | −52 |
| Example 8 | 0.40 | 0.25 | $6 \times 10^9$ | 0.03 | 90 | 15 | −45 |
| Example 9 | 0.47 | 0.24 | $6 \times 10^9$ | 0.04 | 91 | 15 | −42 |
| Example 10 | 0.50 | 0.26 | $5 \times 10^9$ | 0.03 | 90 | 13 | −35 |
| Example 11 | 0.40 | 0.21 | $4 \times 10^9$ | 0.03 | 92 | 18 | −42 |
| Comparative Example 2 | 0.54 | 0.52 | $5 \times 10^9$ | 0.03 | 90 | 10 | −105 |
| Comparative Example 3 | 0.20 | 0.49 | $6 \times 10^9$ | 0.03 | 90 | 28 | −58 |
| Comparative Example 4 | 0.31 | 0.45 | $>10^{12}$ | >60 | 90 | 13 | −145 |
| Comparative Example 5 | 0.20 | 0.42 | $6 \times 10^9$ | 0.03 | 90 | 16 | −52 |
| Comparative Example 6 | 0.58 | 0.35 | $1 \times 10^6$ | 0.01 | 85 | 25 | −122 |
| Comparative Example 7 | 0.42 | 0.25 | $>10^{12}$ | >60 | 90 | 11 | −45 |

The present invention has been explained on the basis of examples above. These examples are only exemplifications, and those skilled in the art will understand that various modifications are possible and such modifications are also within the scope of the present invention.

The invention claimed is:

1. A cover tape comprising at least a substrate layer, an intermediate layer, a charge transfer layer and a heat seal layer, wherein (A) the charge transfer layer comprises an acid-modified polyolefin resin and a conductive agent, and
  (B) the heat seal layer comprises (a) a thermoplastic resin component consisting of an acrylic resin, and (b) a styrene-conjugated diene copolymer or a hydrogenated resin thereof, the mass ratio of the two components ((a)/(b)) being 20/80 to 80/20, and has a sea-island structure wherein the component (a) forms an island region and the component (b) forms a sea region,
  wherein the acid value of (a) the thermoplastic resin component in the heat seal layer is 1 to 10 mg KOH/g, and
  wherein the heat seal layer comprises 1 to 60 parts by mass of a microparticle powder with primary particles having a mass-average particle size of 0.01 to 20 μm, to 100 parts by mass of the thermoplastic resin component.

2. A cover tape according to claim 1, wherein the acid-modified polyolefin resin in the charge transfer layer is a resin modified by an acid anhydride.

3. A cover tape according to claim 1, wherein the acid-modified polyolefin resin in the charge transfer layer is an acid-modified resin of a copolymer of ethylene and carboxylic acid or a derivative thereof.

4. A cover tape according to claim 1, wherein the charge transfer layer comprises at least one of carbon black, metal microparticles, metal oxides, conductive microparticles, Si-based organic compounds, organic conductive polymers, ionic liquids and surfactants.

5. A cover tape according to claim 1, wherein a styrene ratio in (b) the styrene-conjugated diene copolymer or a hydrogenated resin thereof in the heat seal layer is 20 to 70 parts by mass.

6. A cover tape according to claim 1, wherein a surface resistivity of the heat seal layer is within a range of $10^5$ to $10^{12} \Omega/\square$.

7. A cover tape according to claim 1, wherein the intermediate layer, being formed from a single layer or multiple layers, is formed from at least one of ethylene-α-olefin copolymers with a density of 0.915 to 0.940 g/cm³ copolymers of ethylene and carboxylic acid or a derivative thereof, and any of their modified resins.

8. A cover tape according to claim 1, wherein an antistatic layer is provided on the outer surface of the substrate layer.

9. A cover tape according to claim 1 having a total light transmittance of at least 75% and a haze of at most 50%.

10. A cover tape according to claim 1 having a static decay time of at most 2 seconds as measured in accordance with the US military standard MIL-B-81705C.

11. A cover tape according to claim 1, wherein the charge transfer layer has a thickness of 0.01 to 10 μm.

12. A cover tape according to claim 1, wherein the charge transfer layer has a thickness of 0.05 to 5 μm.

13. A cover tape according to claim 1, wherein the acid-modified polyolefin resin is a copolymer of ethylene and a carboxylic acid or a derivative thereof.

14. A cover tape according to claim 1, wherein the acid-modified polyolefin has a ratio of acid modification of 1 to 15 parts based on 100 parts of the acid-modified polyolefin.

15. A cover tape according to claim 1, wherein the acid-modified polyolefin has a ratio of acid modification of 2 to 10 parts based on 100 parts of the acid-modified polyolefin.

16. A cover tape according to claim 1, wherein (a) is a butyl methacrylate/methyl methacrylate copolymer.

* * * * *